United States Patent
Harimoto et al.

(10) Patent No.: US 6,598,571 B1
(45) Date of Patent: Jul. 29, 2003

(54) CAM FOLLOWER WITH ROLLER

(75) Inventors: Kazuyoshi Harimoto, Iwata (JP); Yoshiyasu Nakano, Iwata (JP); Masaru Kitagawa, Iwata (JP); Nobuhiro Kasahara, Iwata (JP)

(73) Assignee: NTN Corporation, Osaka (JP)

( * ) Notice: Subject to any disclaimer, the term of this patent is extended or adjusted under 35 U.S.C. 154(b) by 0 days.

(21) Appl. No.: 10/127,757

(22) Filed: Apr. 23, 2002

(30) Foreign Application Priority Data

Jan. 16, 2002 (JP) ........................................ 2002-007108

(51) Int. Cl.$^7$ ................................................. F01L 1/18
(52) U.S. Cl. ................................ 123/90.44; 123/90.25; 123/90.39; 74/559
(58) Field of Search ........................... 123/90.25, 90.26, 123/90.27, 90.39, 90.44, 90.51; 74/559, 567, 569; 384/548, 565, 625

(56) References Cited

U.S. PATENT DOCUMENTS

| | | | | | |
|---|---|---|---|---|---|
| 662,374 | A | * | 11/1900 | Dooley ....................... | 384/568 |
| 5,159,852 | A | * | 11/1992 | Harimoto ..................... | 74/559 |
| 5,352,303 | A | * | 10/1994 | Murakami et al. ........... | 148/318 |
| 5,361,648 | A | * | 11/1994 | Murakami et al. ........... | 74/569 |
| 5,397,188 | A | * | 3/1995 | Yoshizuka et al. .......... | 384/492 |
| 5,885,690 | A | * | 3/1999 | Sada ........................... | 428/141 |
| 6,051,082 | A | * | 4/2000 | Okita et al. .................. | 148/333 |
| 6,095,013 | A | * | 8/2000 | Hashimoto et al. .......... | 74/569 |
| 6,347,606 | B1 | * | 2/2002 | Tanaka et al. .......... | 123/90.16 |

FOREIGN PATENT DOCUMENTS

| | | | | |
|---|---|---|---|---|
| JP | 05179350 | A | * 7/1993 | ............ C21D/9/28 |
| JP | 05239550 | A | * 9/1993 | ............ C21D/9/36 |
| JP | 2000320646 | A | * 11/2000 | ............ F16H/53/06 |

OTHER PUBLICATIONS

U.S. patent Pub. No. US 2002/0053329 A1, May. 9, 2002.*
NSK Ball and Roller Bearings, Pr. No. 2101S, Feb. 1979, Japan.*
Rolling Bearings and their Contribution to the Progress of Technology FAG Kugelfischer Georg Schafer KGaA, Schweinfurt, Germany, 1986.*

* cited by examiner

*Primary Examiner*—Thomas Denion
*Assistant Examiner*—Ching Chang
(74) *Attorney, Agent, or Firm*—McDermott, Will & Emery

(57) ABSTRACT

The cam follower with roller according to the present invention includes a cam follower body having a roller supporting portion integrally formed therein, a supporting shaft of which both ends are fixed to the roller supporting portion, and a roller rotatably supported to the supporting shaft with a plurality of needle rollers interposed. At least one of the supporting shaft, needle roller and roller is formed of heat-resisting steel, and the both ends of the supporting shaft is caulked to be fixed to the supporting portion.

14 Claims, 6 Drawing Sheets

RATE OF AREA SUBJECTED TO PEELING (%)

CAM FOLLOWER WITH ROLLER

BACKGROUND OF THE INVENTION

1. Field of the Invention

The present invention relates to a cam follower with roller, and more particularly, to a cam follower with roller that is incorporated into a valve mechanism of an internal combustion engine of a vehicle.

2. Description of the Background Art

To increase durability and maintenability of an engine valve system, it is necessary to address the problems related to abrasion and insufficient lubrication of a cam and a follower on a cam shaft.

To prevent abrasion of the valve system, a hydraulic lash adjuster has been practically utilized in an OHV-type engine, and recently, use of a rolling bearing for the follower has rapidly increased in order to reduce abrasion and friction loss of the cam and follower.

A cam is a portion where lubrication easily dies away among other engine components, and a contact surface thereof is called a boundary lubrication area. In a cam follower with roller used under such circumstances, the cam is in contact with the roller basically by rolling contact. However, the rolling contact involves sliding, since absolute rolling movement is hindered by abrupt variations in the load applied onto the roller and by changes in the rolling speed of the roller due to the shape of the cam. Thus, peeling or smearing, i.e. surface damage, occurs on an outer diameter rolling surface of the roller in connection with the lubricating conditions (amount and temperature of oil, debris) and surface roughness of the opposing cam, resulting in a short life.

Moreover, a supporting shaft rotatably supporting the roller is limited in the loaded zone, and thus a very large pressure is applied onto the surface of the supporting shaft, resulting in shorter rolling fatigue life compared to that of the roller or a bearing. Therefore, increase of rolling fatigue life has been desired.

The bearing rotatably supporting the roller is generally a full type roller bearing, which generates skew and relative sliding, so that the bearing is also subjected to surface damage such as peeling and smearing.

It is noted that SUJ2 has conventionally been used for the material of such roller, supporting shaft and bearing.

SUMMARY OF THE INVENTION

An object of the present invention is to provide a cam follower with roller having a roller, a supporting shaft rotatably supporting the roller and a rolling element that are made of heat-resisting, peeling-resisting and smearing-resisting materials, and capable of increasing rolling fatigue life and reducing surface damage under high temperature conditions.

According to the present invention, in a cam follower with roller including a cam follower body having a roller supporting portion integrated into the cam follower body, a supporting shaft of which both ends are fixed to the roller supporting portion, and a roller rotatably supported on the supporting shaft with a plurality of needle rollers interposed; at least one of the supporting shaft, needle roller and roller is formed of heat-resisting steel.

According to a cam follower with roller of the present invention, at least one of the supporting shaft, needle roller and roller is formed of the heat-resisting steel, so that the heat resistance can be improved and surface damage such as smearing and peeling can be prevented, resulting in increase of rolling fatigue life under high temperature conditions.

In the cam follower with roller, preferably, the both ends of the supporting shaft is caulked to be fixed to the roller supporting portion.

Thus, the both ends of the supporting shaft are caulked to be fixed to the roller supporting portion, and this caulking and fixing work can be performed merely by notching an end surface of the supporting shaft. Therefore, no impact is applied onto the roller supporting portion, so that the cam follower would not be deformed at assembling.

In the cam follower with roller, preferably, a rolling contact surface on which the needle roller rolls, of an outer circumferential surface of the supporting shaft, is subjected to high frequency quenching so as to have a surface hardness of at least HV 650, and the both ends of the supporting shaft is subjected to no quenching so as to have a surface hardness of at least HV 200 and at most HV 280.

Since the rolling contact surface has a surface hardness of at least HV 650, it can remain intact when the needle roller rolls, without the supporting shaft being deformed due to abrasion. Furthermore, both end surfaces of the supporting shaft has a surface hardness in the range between HV 200 and HV 280, so that the end surfaces can be notched at assembling to enlarge the edge portion. Such a caulking process generates no crack at the ends, allowing the supporting shaft to be easily and firmly fixed to the cam follower body.

In the cam follower with roller, preferably, the supporting shaft is through-quenched and is press-fit to the roller supporting portion.

Thus, the supporting shaft is through-quenched, allowing the hardness to be higher. Furthermore, the supporting shaft is press-fit to the roller supporting portion, so that the supporting shaft can be fixed to the roller supporting portion even if the supporting shaft is produced by the through quenching which allows no caulking for fixing.

In the cam follower with roller, preferably, the supporting shaft is through-quenched and is fixed to the roller supporting portion in the axial direction of the supporting shaft with a snap ring interposed.

Thus, the supporting shaft is through-quenched, allowing the hardness to be higher. Furthermore, the supporting shaft is fixed by the snap ring, so that the supporting shaft can be fixed to the roller supporting portion without press-fitting or caulking work.

In the cam follower with roller, preferably, the roller is made of heat-resisting steel.

In particular, the roller is in rolling-contact with the cam while sliding, and thus the sliding or tangential stress may act onto the roller to increase the temperature on the roller surface, or shear heating occurs in lubrication oil to reduce the thickness of an oil film. This may easily cause surface damage such as peeling and smearing. Such surface damage can, however, be prevented by using the heat-resisting steel for the roller.

In the cam follower with roller, preferably, the heat-resistant steel is made of a steel material at least containing as alloy elements in a matrix, by mass %, at least 0.6% and at most 1.3% of C(carbon), at least 0.3% and at most 3.0% of Si(silicon), at least 0.2% and at most 1.5% of Mn(manganese), at most 0.03% of P(phosphorus), at most 0.03% of S(sulfur), at least 0.3% and at most 5.0% of Cr(chromium), at least 0.1% and at most 3.0% of Ni(nickel), at most 0.050% of Al(aluminum), at most 0.003% of Ti(titanium), at most 0.0015% of O(oxygen) and at most 0.015% of N(nitrogen), and a remaining part of Fe(iron) and an unavoidable impurity.

The use of the steel material allows rolling fatigue life to be elongated by quenching and tempering, under the environment contaminated with debris, without a carbonitriding process. Thus, carbonitriding can be dispensed with, reducing the manufacturing cost. Moreover, the steel material is superior in its heat resistance, peeling-resisting property and smearing-resisting property, so that rolling fatigue life can be increased and surface damage can be reduced under high temperature conditions.

The reasons for limitations of each component indicated above will be described below.

(1) C Content (at Least 0.6% and at Most 1.3%)

C is a requisite element for securing the strength as a rolling bearing, and at least 0.6% of the C content is required to maintain the hardness after a prescribed heat treatment. Thus, the lower limit of the C content is set to be 0.6%. Moreover, if the content of C exceeds 1.3%, large carbide appears, resulting in shorter rolling fatigue life. Therefore, the upper limit of the C content is set to be 1.3%.

(2) Si Content (at Least 0.3% and at Most 3.0%)

Si is preferably added because it has a function of suppressing softening in a high temperature range and improving heat resistance of the rolling bearing. When Si content is less than 0.3%, such effect cannot be attained. Therefore, the lower limit of the Si content is set to be 0.3%. As the Si content increases, heat resistance also improves. The effect, however, is saturated when the Si content is added exceeding 3.0%, while susceptibility to hot working and machinability are degraded. Therefore, the upper limit of the Si content is set to be 3.0%.

(3) Mn Content (at Least 0.2% and at Most 1.5%)

Mn is an element used for deoxidation in manufacturing of steel, and at the same time, is an element that improves a quenching property. In order to obtain such effects, it is necessary to add Mn by at least 0.2%. Thus, the lower limit of the Mn content is set to be 0.2%. When the content exceeds 1.5%, however, machinability degrades significantly. Therefore, the upper limit of the Mn content is set to be 1.5%.

(4) P Content (at Most 0.03%)

P is segregated at austenite grain boundary of the steel, causing degradation of toughness and rolling fatigue life. Therefore, the upper limit of the content is set to be 0.03%.

(5) S Content (at Most 0.03%)

S hinders susceptibility of steel to hot working and forms a non-metallic inclusion in the steel, degrading toughness and rolling fatigue life. Therefore, the upper limit of the S content is set to be 0.03%. Moreover, though S is disadvantageous in the aspect described above, it has an effect of improving machinability. Therefore, though much smaller content of S is desirable, addition of S may be allowed within the range of up to 0.005%.

(6) Cr Content (at Least 0.3% and at Most 5.0%)

Cr serves an important role in this alloy composition and is added to improve the quenching property, to ensure the hardness due to the carbide, and to elongate lifetime. In order to obtain prescribed carbide, it is necessary to add at least 0.3% of the Cr content, and therefore the lower limit of the Cr content is set to be 0.3%. However, when the content exceeds 5.0%, large carbide appears, degrading rolling fatigue life. Therefore, the upper limit of the Cr content is set to be 5.0%.

(7) Al Content (at Most 0.050%)

Al is used as a deoxidizer at manufacturing of steel. However, the content thereof is preferably reduced, since Al generates a hard oxide-based inclusion, degrading rolling fatigue life. Further, a large amount of Al exceeding 0.050% would significantly deteriorate rolling fatigue life. Therefore, the upper limit of the Al content is set to 0.050%.

It is noted that less than 0.005% of the Al content would raise the manufacturing cost of steel, and thus the lower limit of the Al content is preferably set to 0.005%.

(8) Ti Content (at Most 0.003%); O Content (at Most 0.0015%); and N content (at most 0.015%)

Ti, O and N form oxide and nitride in the steel, and serve as non-metallic inclusions that would be sources of fatigue fracturing, to degrade rolling fatigue life. Therefore, the upper limits of the elements are respectively set as follows: 0.003% for Ti, 0.0015% for O and 0.015% for N.

(9) Ni Content (at Least 0.1% and at Most 3.0%)

Ni is an element serving an important role in the present invention. In particular, Ni suppresses change in the structure during the process of rolling fatigue when used in a high temperature environment, and has the effect of preventing deterioration of hardness in a high temperature range and elongating rolling fatigue life. In addition, Ni is also effective at improving toughness and elongating lifetime under a debris contamination environment, while improving corrosion resistance. In order to attain such effects, at least 0.1% of the Ni content is required, and thus the lower limit of the Ni content is set to be 0.1%. When the content exceeds 3.0%, however, a large amount of retained austenite is generated at the time of quenching, making it difficult to attain a prescribed hardness and, in addition, the cost of the steel material increases. Therefore, the upper limit of the Ni content is set to be 3.0%.

In the cam follower with roller, preferably, the steel material is formed by one of quenching and carburizing processes followed by a tempering process.

Each component of the cam follower with roller used in a high-temperature range as in the present invention is subjected to the tempering process at a temperature equal to or higher than an environment temperature, in order to stabilize the size of each component under the environment of use.

In the cam follower with roller, preferably, an effective hardened portion with a hardness of at least HV 550 has a depth of at least 1.0 mm, in a rolling contact surface on which the needle roller rolls, of an outer circumferential surface of the supporting shaft.

Thus, a sufficient hardness can be attained for the surface on which the needle roller rolls.

In the cam follower with roller, preferably, the supporting shaft is made of the heat-resistant steel.

This limits a loaded zone, and a very large pressure is applied on the surface, so that rolling fatigue life can be increased even in the supporting shaft having a strict condition of rolling fatigue life.

In the cam follower with roller, preferably, the needle roller is made of the heat-resistant steel, is quenched and hardened to a core, and has a surface hardness of at least HV 650.

This allows the peeling-resistant property and smearing-resistant property to be improved even in the needle roller at which skew and relative sliding occurrs at the time of rolling.

In the cam follower with roller, preferably, the roller is quenched and hardened to a core, and has a surface hardness of at least HV 650.

This can assure a sufficient hardness in rolling.

In the cam follower with roller, preferably, an infinite number of microscopic concave recesses are randomly formed on an outer surface of the roller. When surface roughness of the outer surface of the roller obtained in each of axial and circumferential directions is indicated by a parameter RMS, a ratio (RMS(L)/RMS(C)) of axial surface roughness RMS(L) to circunferential surface roughness RMS(C) is at most 1.0, and a parameter SK value of the surface roughness is at most −1.6.

Thus, even under a condition in which roughness is inferior on the finished surface of the opposing cam, an excellent ability of forming an oil film can be attained so that a sufficient thickness of the oil film can be secured, and therefore, the rolling contact portion can be prevented, as much as possible, from being in contact with metal. Furthermore, the surface of the rolling contact portion that is in contact with metal is reduced, so that the outer diameter of the cam follower can be free from surface damage, peeling and smearing, as well as unusual abrasion and separation therefrom. Therefore, durability can be increased.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the present invention will be described below.

Figure 1:
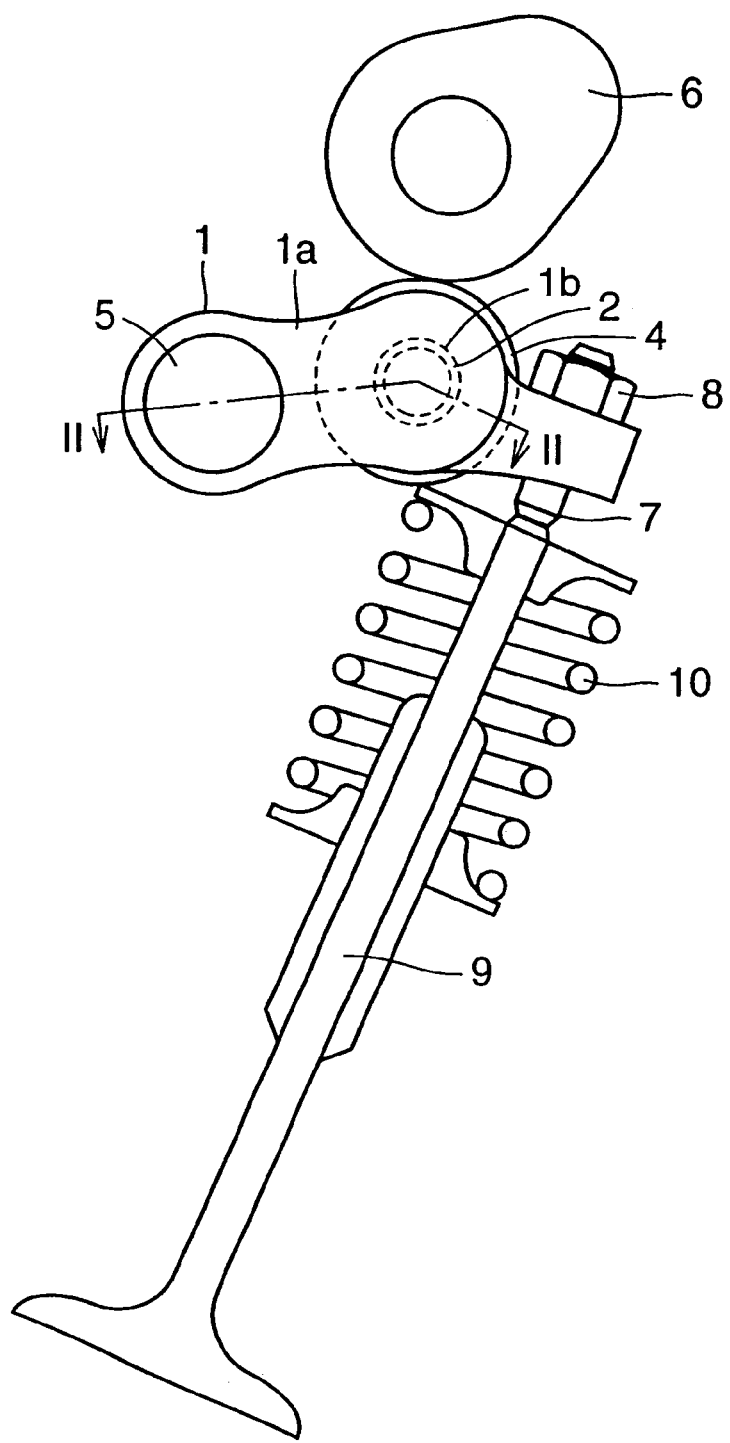
FIG. 1 is a schematic front view showing a structure of the cam follower with roller according to one embodiment of the present invention.
Figure 2:
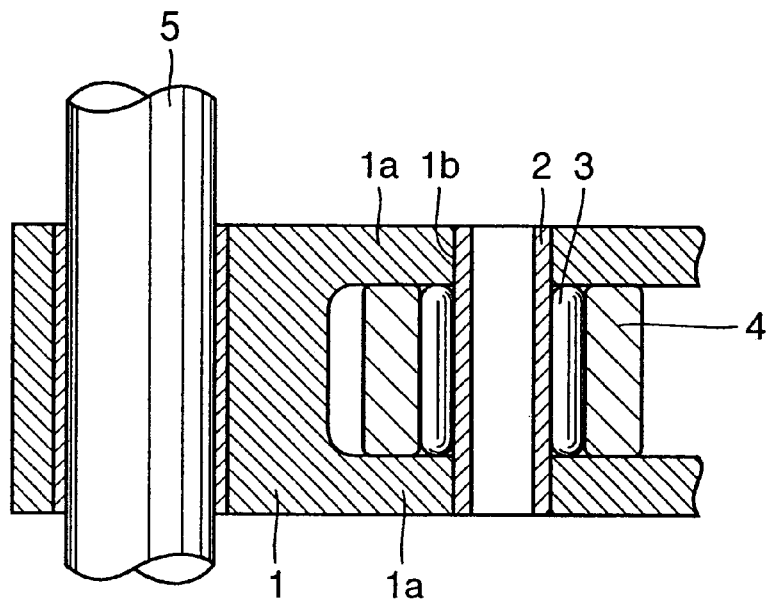
FIG. 2 is a schematic section view taken along the line II—II in FIG. 1 in the direction of the arrows.

Referring to FIGS. 1 and 2, one end of a cam follower body 1 is rotatably supported onto a cam follower shaft 5 with bearing metal or the like interposed.

An adjust screw 7 is mounted in a helical manner to the other end of cam follower body 1. Adjust screw 7 is fixed by a lock nut 8, and a lower end thereof is in contact with an upper end of a protruded rod 9 of a suction valve or an exhaust valve of an internal combustion engine. Protruded rod 9 is biased by resilience of a spring 10.

A roller supporting portion 1a is integrally formed in a bifurcated manner at the middle portion of cam follower body 1. Both ends of roller shaft 2 are fixed to a shaft hole 1b provided at the bifurcated roller supporting portion 1a by press-fitting or by a snap ring. A roller 4 is rotatably supported in the middle of an outer circumferential surface of roller shaft 2 with a needle roller 3 interposed. The outer circumferential surface of roller 4 is pressed by resilience of spring 10 to be in contact with a cam surface of cam 6.

By such an arrangement, rotation of cam 6 allows cam follower body 1 to rotate around cam follower shaft 5 with roller 4 interposed, to open and close the suction valve or exhaust valve attached at a tip end of protruded rod 9.

It is noted that the internal engine includes, for example, a piston reciprocating within a cylinder, and an ignition plug igniting the fuel compressed by the piston.

At least one of roller shaft 2, needle roller 3 and roller 4 is formed of heat-resisting steel, and roller shaft 2 has a hollowed shape as a result of through quenching. A switching pin (not shown) is inserted into the hollow of roller shaft 2 to allow various opening and closing functions of a valve. Further, hollow inside of roller shaft 2 contributes to weight saving.

Figure 3:
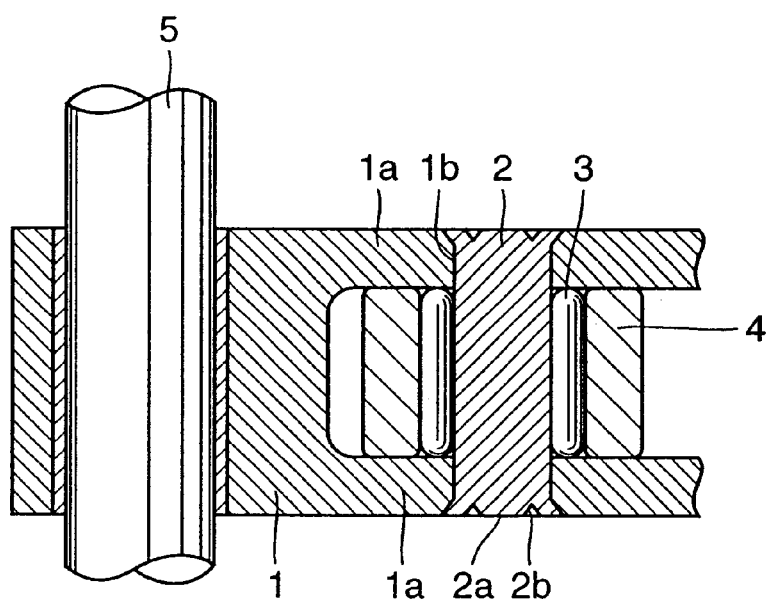
FIG. 3 is a schematic section view showing a structure in which a roller shaft is formed to have a solid structure and is caulked to be fixed.

It is noted that roller shaft 2 may have a shape other than the through-quenched hollowed shape, e.g. a solid structure, and both ends thereof may be caulked to be fixed to roller supporting portion 1a, as shown in FIG. 3. This caulking is performed by notching an end surface 2a of roller shaft 2 to form a caulking groove 2b after roller shaft 2 is fit into shaft hole 1b provided at the bifurcated roller supporting portion 1a. By forming caulking groove 2b, the edge portion of roller shaft 2 is enlarged and the inner surface of shaft hole 1b is biased by resilience, so that roller shaft 2 is firmly fixed to shaft hole 1b.

Figure 4A:
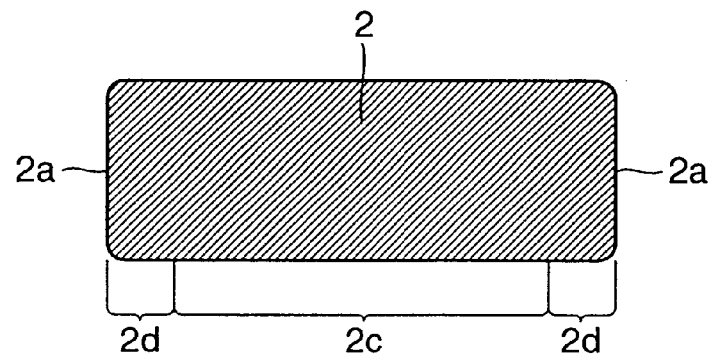
FIGS. 4A and 4B are a vertical section view of the roller shaft shown in FIG. 3, and a graph showing the distribution of hardness of the roller shaft, respectively.
Figure 4B:
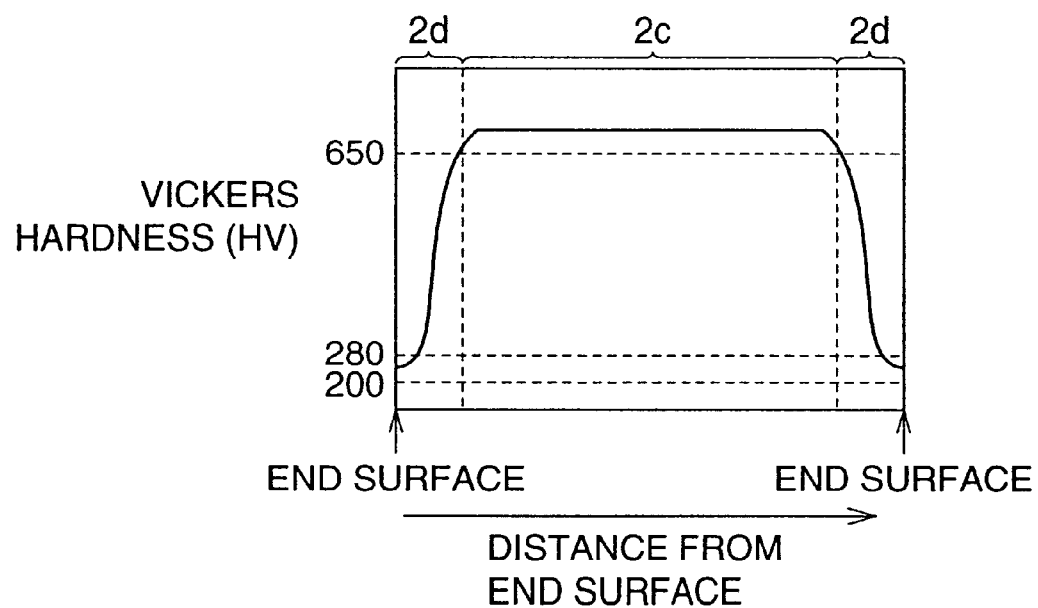

Referring to FIGS. 4A and 4B, a middle portion 2c of roller shaft 2 is a portion hardened by high-frequency quenching, whereas both ends 2d are unquenched portions for which no quenching has been performed. It is noted that a part or all of the outer circumferential surface of middle portion 2c is to be a so-called rolling contact surface on which needle roller 3 rolls.

Referring to FIG. 4B, in the distribution of hardness of the roller shaft 2 surface, middle portion 2c has the Vickers hardness of at least HV 650, whereas the softened portions of both ends 2d have the Vickers hardness in the range between HV 200 and HV 280. Therefore, middle portion 2c has a sufficient hardness for a rolling contact surface of needle roller 3, whereas softened portions 2d are soft enough for caulking.

It is noted that roller shaft 2 is fixed in different ways depending on the material of the bifurcated roller supporting portion 1a and the heat treatment method of roller shaft 2, as shown in the table below.

TABLE 1

| Material of supporting portion | Heat treatment method of supporting shaft | | | |
| --- | --- | --- | --- | --- |
| | High-frequency quenching | | Through quenching | |
| | Hollowed shaft | Solid shaft | Hollowed shaft | Solid shaft |
| Carburized steel | Caulking | Caulking | Snap ring | Snap ring |
| Aluminum ally | Caulking | Caulking | Press-fitting | Press-fitting |

Figure 5:
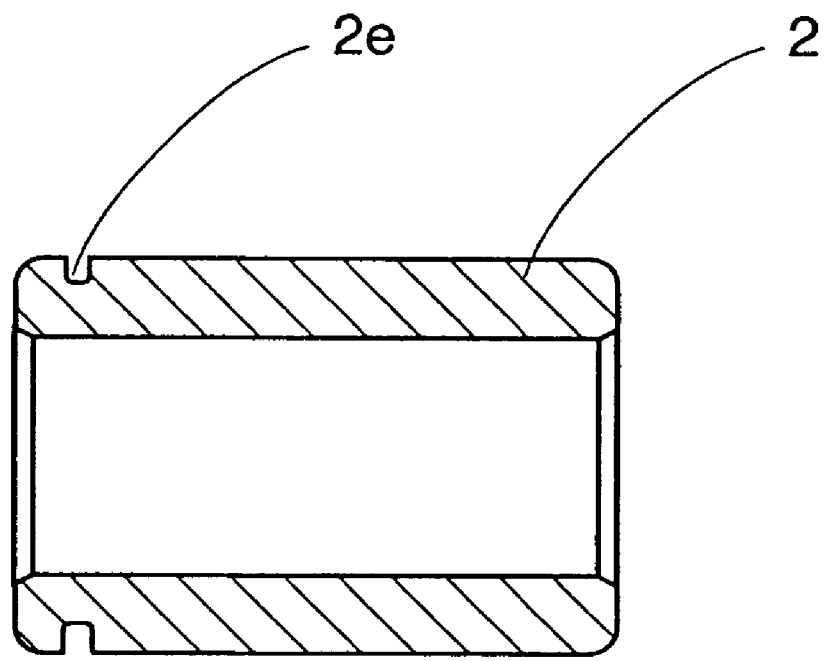
FIG. 5 is a schematic section view showing a structure of the roller shaft when fixed by a snap ring.

When through-quenched, roller shaft 2 cannot be caulked and fixed to the bifurcated roller supporting portion 1a. Thus, as shown in FIG. 5, an annular groove 2e is formed at one supporting portion of the bifurcation (inner diameter) and on roller shaft 2, and a snap ring is pre-mounted into annular groove 2e of roller shaft 2. Roller shaft 2 is inserted into roller supporting portion 1a while the diameter of the snap ring is reduced, and then the snap ring is restored by resilience at the position where annular groove 2e is arranged, to allow roller shaft 2 to be fixed in the direction of axis thereof. This can eliminate the need for press-fitting or caulking work to fix roller shaft 2.

Here, though roller shaft 2 can be fixed in the direction of axis, roller shaft 2 may possibly creeps (rotates). In particular, when an aluminum alloy is used as a material of the bifurcated roller supporting portion 1a for the purpose of weight saving, disadvantageous abrasion occurs due to the creeping. When roller shaft 2 is through-quenched allowing no caulking, the roller shaft is press-fit into the bifurcated roller supporting portion 1a.

The first heat-resistant steel according to the present invention is a steel material at least containing in the matrix, as alloy elements, at least 0.6% and at most 1.3% of C, at least 0.3% and at most 3.0% of Si, at least 0.2% and at most 1.5% of Mn, at most 0.03% of P, at most 0.03% of S, at least 0.3% and at most 5.0% of Cr, at least 0.1% and at most 3.0% of Ni, at most 0.050% of Al, at most 0.003% of Ti, at most 0.0015% of O, and at most 0.015% of N, all by mass %, the remaining part having Fe and an unavoidable impurity (such a steel material is referred to as "invention steel 1" in the embodiments of the present invention).

Moreover, the heat-resistant steel material is subjected to quenching or carbonitriding followed by a tempering process.

Furthermore, as another heat-resistant steel, a steel material may be used at least containing, in the matrix, at least 0.95% and at most 1.10% of C, at least 1% and at most 2% of Si or Al, at most 1.15% of Mn, and at least 0.90% and at most 1.60% of Cr, all by mass %; the remaining part having Fe and an unavoidable impurity; and at most 13 ppm of O. A product formed by such a material is quenched and thereafter tempered at a high temperature in the range between 230 and 300° C. to have retained austenite of at most 8% by volume and a hardness of at least HRC 59 (such a steel material is referred to as "invention steel 3" in the embodiments of the present invention).

In addition, as a further heat-resisting steel, a steel material having a composition within the range as indicated in Table 2 below may be used (referred to as "invention steel 2" in the embodiments of the present invention).

An infinite number of microscopic concave recesses are formed on the outer circumferential surface of roller 4. When surface roughness of the outer circumferential surface of roller 4 is obtained in the directions of axis and circumference respectively and indicated by a parameter RMS, the ratio (RMS(L)/RMS(C)) of the surface roughness in the axial direction RMS(L) to that in the circumferential direction RMS(C) is preferably equal to or lower than 1.0, whereas a parameter SK value of the surface roughness is preferably equal to or lower than −1.6.

Here, parameter RMS is a value of a square root obtained as follows: each square of deviation in the range from the center line to a roughness curve f(x) is integrated in a section of a measurement length, and the squares in the section are averaged, to obtain the square root of the average. This parameter value is also called a roughness indicated by Root Mean Square. RMS can be calculated from a section curve and a roughness curve, which are enlarged for recording, by numerical calculation.

As a surface treatment process for attaining a roughness condition of the outer circumferential surface described above, special barrel polishing may be applied to obtain a desirable finished surface.

In the treatment method, the roller surface is provided with concave and convex portions randomly formed thereon using a chip by, e.g. a centrifugal fluidizing barrel polishing, followed by washing, and is further subjected to a surface finishing process using barrel polishing so that the microscopic convex portions on the surface are removed or rounded, resulting in an infinite number of microscopic concave portions left on the roller surface. Such processing, which is performed for the surface roughness of the roller outer circumferential surface to attain a desired value, is hereinafter referred to as HL processing.

The parameter SK value is obtained by quantifying skewness of the distribution curve of the surface roughness, i.e. asymmetry of distribution of the concave and convex portions when the centerline of the roughness is taken as a boundary. A negative SK value indicates that there are a larger number of concave portions (valleys) below the centerline, whereas a positive SK value indicates that there are a larger number of convex portions (protrusions) above the centerline. The parameter SK value of the surface roughness is represented by the definitional equation below.

$$SK = \int (X - x_G)^3 P(X) dx / \sigma^3$$

X: height of roughness

TABLE 2

| C | Mo | Cr | V | Mn | Si | Co | W | Cu | Ni | P | S |
|---|---|---|---|---|---|---|---|---|---|---|---|
| 0.77– 0.85 | 4.00– 4.50 | 3.75– 4.25 | 0.90– 1.10 | at most 0.35 | at most 0.25 | at most 0.25 | at most 0.25 | at most 0.10 | at most 0.10 | at most 0.015 | at most 0.015 |

(All values in the table indicated by mass %)

At the rolling contact surface on which needle roller 3 rolls, of the outer circumferential surface of roller shaft 2, the effective hardened portion with a hardness of at least HV 550 preferably has a depth of at least 1.0 mm. Moreover, needle roller 3 is made of heat-resisting steel, which is preferably quenched and hardened through to the core portion and has a surface hardness of at least HV 650. Roller 4 is preferably quenched and hardened through to the core portion and has a surface hardness of at least HV 650.

$x_G$: average height of roughness

P(X): probability density distribution of amplitude of roughness

σ: roughness by Root Mean Square

The average height of the roughness in the definitional equation for obtaining the SK value means an absolute value taken from a reference of the centerline in each individual case. Here, the difference between the center line and the average height is discussed. When the total area of protrusions above a line is the same as that of valleys below the line, the line is defined as the center line of roughness. However, this is only a hypothetical line, and an absolute value taken from a reference is required in order to obtain the SK value. This absolute value is defined as the average height.

The parameter SK value is set to have a mean of at most −1.6 in both the circumferential and axial directions, and thus a number of microscopic concave portions are present below the center line. The numerical value of the surface roughness in directions, i.e. RMS(L)/RMS(C), is defined to be at most 1.0, so that an effective range for forming an oil film can be obtained in both the shape and distribution of the surface recesses.

The parameter SK value indicated above serves as a guideline for finding a degree of asymmetry of the concave and convex distribution. In an example of the curve of roughness on a general polished surface, the SK value is close to 0 in a symmetric distribution of concave and convex portions, is negative when the concave and convex distribution on the surface is biased to the recess side, and is positive when the distribution is biased otherwise.

By defining the surface roughness of the outer surface of roller 4 as described above, even under a condition in which roughness on the finished surface of the opposing cam is inferior, the outer surface of roller 4 can ensure a superior ability of forming an oil film and a sufficient thickness of the oil film. Therefore, a contact portion can have minimum contact with metal.

The area of the rolling contact portion that is in contact with metal is made smaller as described above, so that surface damage, i.e. peeling and smearing as well as unusual abrasion and separation therefrom, can be prevented. Therefore, durability can be improved.

Experimental examples of the present invention will be described below.

(1) Surface-damage-resisting Property (Peeling-resisting Property, Smearing-resisting Property) Test When low viscosity oil is used, or when viscosity is reduced due to increased temperature of lubrication oil, it is difficult for an oil film to be formed on a bearing raceway surface, resulting in easy contact with metal. Under such a condition, surface damage called peeling (damage due to microscopic separations and surface cracks being closely formed) may occur. Moreover, when the rate of relative sliding is high on the contact surface, heat due to the contact with metal generates local adhesion, which may cause damage called smearing.

Figure 6:
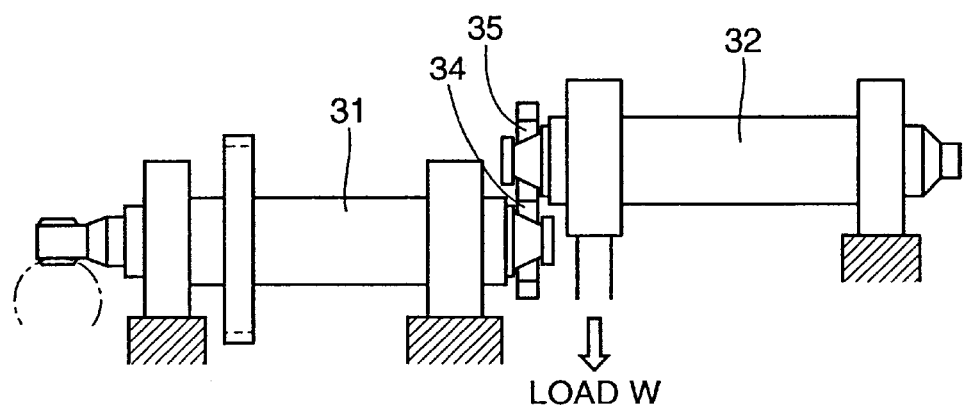
FIG. 6 schematically shows a structure of a two-cylinder test machine.

For such surface damage, evaluation was performed using a two cylinder test machine shown in FIG. 6. Referring to FIG. 6, ring test pieces 34 and 35 having slow curvature to conform to cylindrical portions are attached, respectively, to a driving shaft 31 and to a driven shaft 32 which is parallel to driving shaft 31, and the cylindrical surfaces of the both test pieces 34 and 35 are pressed to each other for rolling, to perform the peeling and smearing tests.

Condition in the peeling test is indicated in Table 3 below.

TABLE 3

| Peeling test condition | |
|---|---|
| Test machine | 2-cylinder test machine |
| Tangential stress | Pmax = 2.3 GPa |
| Rotational speed | 2000 rpm |
| Lubrication | Turbine oil VG46 |
| Evaluation standard | Rate of area subjected to peeling |

It is noted that a polishing process is performed on cylindrical test piece 34 on the driving side, whereas a superfinishing process is performed on cylindrical test piece 35 on the driven side, before providing the test pieces for the test.

In addition, the peeling-resisting property is evaluated by the rate of the peeled area on the driven-side cylindrical test piece 35. The result is shown in FIG. 7.

Figure 7:
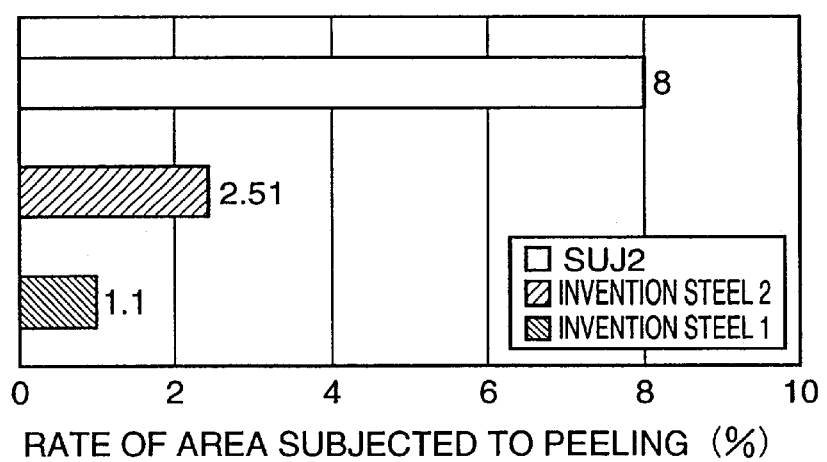
FIG. 7 shows the result of a peeling test.

As can been seen from FIG. 7, the peeling occurence rate of invention steel 1 is approximately one-eighth that of SUJ2, and invention steel 1 has a superior property against surface damage. Moreover, the rate of the area subjected to peeling is significantly low in invention steel 2, which also has a superior property against surface damage.

This indicates that the use of heat-resisting steel such as invention steel 1 or invention steel 2 improves the peeling-resisting property compared to the case with SUJ2.

As for the smearing-resisting property, the rotational speed of the cylinder on one side is increased to provide relative sliding to the rolling contact portion of the two cylinders that are in contact with each other, to measure a relative rotational speed until smearing occurs, and the relative rotational speed at occurrence of smearing is used to evaluate the smearing property. Condition of the smearing test is indicated in Table 4 below.

TABLE 4

| Smearing test condition | |
|---|---|
| Test machine | 2-cylinder test machine |
| Tangential stress | Pmax = 2.1 GPa |
| Rotational speed | Fixed side: 200 rpm |
| | Driven side: increased from 200 rpm in increments of 100 rpm |
| Lubrication | Turbine oil VG46 |
| Evaluation standard | Relative rotational speed at occurrence of smearing |

Figure 8:
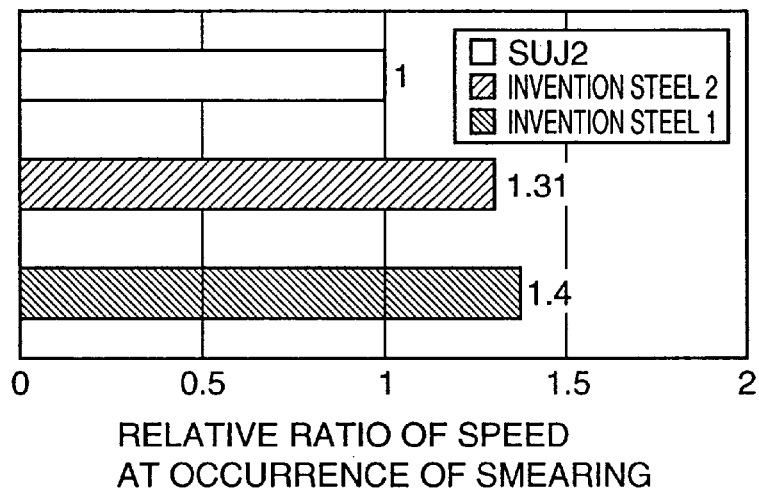
FIG. 8 shows the result of a smearing test.

The result obtained with the test condition above is shown in FIG. 8.

As shown in FIG. 8, the relative rotational speed (sliding speed) at occurrence of smearing is 1.4 times as high as that of SUJ2, indicating a superior smearing property. Moreover, as for invention steel 2, the relative rotational speed is approximately 1.3 times as high as that of SUJ2, also indicating a superior smearing property.

This shows that the use of the heat-resisting steel such as invention steel 1 or invention steel 2 improves the smearing-resisting property compared to SUJ2.

(2) Strength of Invention Steel 1

A ring test piece with an outer diameter of 60×an inner diameter of 45×a width 15 (mm) is fabricated to be used for examining fracture strength of the ring. Moreover, JIS No.3 test piece for Charpy impact test (U notch) is used to examine impact strength and fracture toughness ($K_{Ic}$).

The result is indicated in Table 5 below.

TABLE 5

Result of strength tests
Fracture strength of developed steel

| Type of steel | Static fracture strength of ring (kN) | Charpy impact value (J/cm$^2$) | Fracture toughness (Mpa$\sqrt{}$m) |
|---|---|---|---|
| Invention steel 1 | 45.0 | 7.83 | 15.2 |
| SUJ2 | 45.0 | 5.54 | 15.0 |

As can be seen from the result indicated in Table 5, any property value of invention steel 1 is almost the same as that of SUJ2, and therefore, invention steel 1 can be practically used without a problem related to crack strength.

(3) φ12 Point-contact Life Test

Figure 9A:
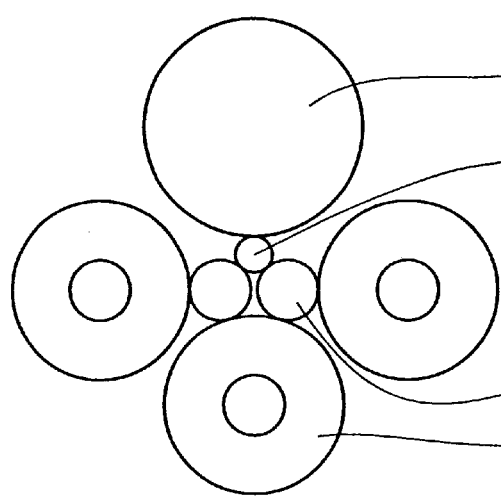
FIGS. 9A and 9B are a front view and a side view, respectively, showing a device performing a $\phi$12 point-contact life test.
Figure 9B:
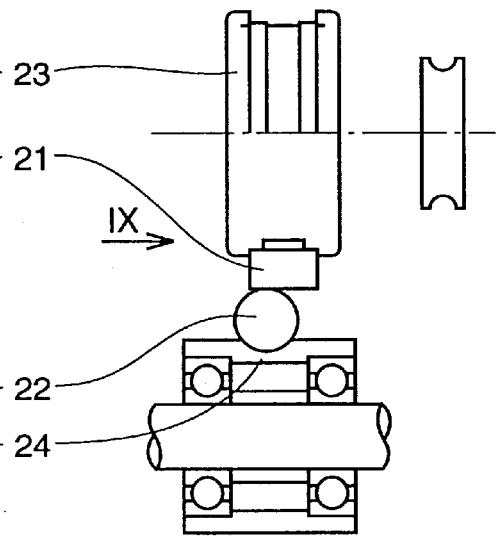

This test is performed as follows. Referring to FIGS. 9A and 9B, a driving wheel 23 is driven to be rotated while cylindrical test piece 21 of φ12×L22 is held between driving wheel 23 and a rigid ball 22 touching a guide wheel 24, and the lifetime in such a condition (L10 life) is measured. It is noted that FIG. 9A corresponds to FIG. 9B viewed in the direction of the arrow denoted by IX.

The test condition is indicated in Table 6, and the value of life obtained as a result of the test (L10 life) and the ratio of the L10 life are indicated in Table 7. It is noted that the L10 life means the number of loads that can be applied with 90% of test-piece samples undamaged.

TABLE 6

| Life test condition | |
|---|---|
| Test machine | Point-contact-type life test machine |
| Test piece | φ12 × 122 straight roller |
| Opposing rigid ball | φ19.525 (3/4) |
| Tangential stress | Pmax = 5.88 GPa |
| Load speed | 46240 times/min |
| Lubrication | Turbine VG68 circulating lubrication |
| Oil temperature | 90° C. |

TABLE 7

Result of φ12 point-contact life test (× $10^4$ for L10 life)

| Type of steel | Heat treatment | L10 | | L10 ratio |
|---|---|---|---|---|
| Invention steel 1 | High-frequency quenching | >85193 | >10.26 | >10.76 |
| | Through quenching | 60000 | 7.17 | 7.57 |
| SUJ2 | High-frequency quenching | 7921 | 0.95 | 1 |
| | Through quenching | 8372 | 1 | 1.06 |

As can be seen from the result above, either high-frequency quenched or through quenched, invention steel 1 has a significantly longer life compared to SUJ2.

Moreover, compared to the case with SUJ2, invention steel 3 also has improved peeling-resisting property, smearing-resisting property and L10 life.

It is appreciated from the description above that the use of the heat-resisting steel such as invention steel 1, invention steel 2 and invention steel 3 improves heat resistance, peeling-resisting property and smearing-resisting property, resulting in longer life, compared to the conventionally-used SUJ2.

It is noted that, irrespective of the composition experimented herein, a steel that can obtain a characteristic similar to that of each of the invention steels 1 to 3 above is considered to be a heat-resisting steel of the present invention. The heat-resisting steel of the present invention has peeling-resisting property, smearing-resisting property and L10 life that are superior to those of SUJ2. Moreover, the heat-resisting steel of the present invention has a peeling occurring rate of approximately 2.51/8 of that of SUJ2, and a relative speed ratio of smearing occurrence of approximately 1.3 times that of SUJ2 or higher.

According to the cam follower with roller of the present invention, at least one of the supporting shaft, needle roller and roller is made of the heat-resisting steel, so that heat resistance, peeling-resisting property and smearing-resisting property can be improved while rolling fatigue life can be elongated and surface damage is reduced under high temperature conditions.

In addition, provision of so-called HL processing onto the outer diameter surface of the roller can further improve resistance to surface damage.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A cam follower with roller, comprising:
    a cam follower body having a roller supporting portion integrated into the cam follower body;
    a supporting shaft of which both ends are fixed to said roller supporting portion; and
    a roller rotatably supported on said supporting shaft with a plurality of needle rollers interposed, wherein
        at least one of said supporting shaft, said needle rollers and said roller is formed of heat-resistant steel, and
        an effective hardened portion in a rolling contact surface of an outer circumferential surface of said supporting shaft, upon which said needle roller rolls, has a hardness of at least HV 550 and a depth of at least 1.0 mm.

2. The cam follower with roller according to claim 1, wherein
    both ends of said supporting shaft is caulked to be fixed to said roller supporting portion.

3. The cam follower with roller according to claim 2, wherein
    a rolling contact surface on which said needle roller rolls, of an outer circumferential surface of said supporting shaft, is subjected to high frequency quenching so as to have a surface hardness of at least HV 650, and
    both ends of said supporting shaft is subjected to no quenching so as to have a surface hardness of at least HV 200 and at most HV 280.

4. The cam follower with roller according to claim 1, wherein
    said supporting shaft is subjected to through quenching and is press-fit to said roller supporting portion.

5. The cam follower with roller according to claim 1, wherein
    said supporting shaft is subjected to through quenching and is fixed to said roller supporting portion in a direction of axis of said supporting shaft with a snap ring interposed.

6. The cam follower with roller according to claim 1, wherein
    said roller is made of said heat-resistant steel.

7. The cam follower with roller according to claim 1, wherein
    said heat-resistant steel is made of a steel material at least containing as alloy elements in a matrix, by mass %, at least 0.6% and at most 1.3% of C, at least 0.3% and at most 3.0% of Si, at least 0.2% and at most 1.5% of Mn, at most 0.03% of P, at most 0.03% of S, at least 0.3% and at most 5.0% of Cr, at least 0.1% and at most 3.0% of Ni, at most 0.050% of Al, at most 0.003% of Ti, at most 0.0015% of O and at most 0.015% of N, and a remaining part having Fe and an unavoidable impurity.

8. The cam follower with roller according to claim 7, wherein
    said steel material is formed by one of quenching and carburizing processes followed by a tempering process.

9. The cam follower with roller according to claim 1, wherein
    said supporting shaft is made of said heat-resistant steel.

10. The cam follower with roller according to claim 1, wherein said needle roller is made of said heat-resistant steel, is quenched and hardened to a core, and has a surface hardness of at least HV 650.

11. The cam follower with roller according to claim 1, wherein
said roller is made of heat-resistant steel, is quenched and hardened to a core, and has a surface hardness of at least HV 650.

12. The cam follower with roller according to claim 1, wherein
an infinite number of microscopic concave recesses are randomly formed on an outer surface of said roller, and
when surface roughness of the outer surface of said roller is obtained for each of axial and circumferential directions and indicated by a parameter RMS, a ratio (RMS(L)/RMS(C)) of axial surface roughness RMS(L) to circumferential surface roughness RMS(C) is at most 1.0, and a parameter SK value of the surface roughness is at most −1.6.

13. A cam follower with roller, comprising:
a cam follower body having a roller supporting portion integrated into the cam follower body;
a supporting shaft of which both ends are fixed to said roller supporting portion; and
a roller rotatably supported on said supporting shaft with a plurality of needle rollers interposed, wherein
at least one of said supporting shaft, said needle rollers and said roller is formed of heat-resistant steel, and
said heat-resistant steel is made of a steel material at least containing as alloy elements in a matrix, by mass %, at least 0.6% and at most 1.3% of C, at least 0.3% and at most 3.0% of Si, at least 0.2% and at most 1.5% of Mn, at most 0.03% of P, at most 0.03% of S, at least 0.3% and at most 5.0% of Cr, at least 0.1% and at most 3.0% of Ni, at most 0.050% of Al, at most 0.003% of Ti, at most 0.0015% of 0 and at most 0.015% of N, and a remaining part having Fe and an unavoidable impurity.

14. The cam follower with roller according to claim 13, wherein
said steel material is formed by one of quenching and carburizing processes followed by a tempering process.

* * * * *